United States Patent
Rodzevski et al.

(10) Patent No.: US 9,532,275 B2
(45) Date of Patent: Dec. 27, 2016

(54) BODY CONTACT COMMUNICATION OPTIMIZATION WITH LINK KEY EXCHANGE

(71) Applicant: Sony Corporation, Tokyo (JP)

(72) Inventors: Aleksandar Rodzevski, Malmö (SE); Linus Mårtensson, Lund (SE); Erik Westenius, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/612,540

(22) Filed: Feb. 3, 2015

(65) Prior Publication Data
US 2016/0227446 A1 Aug. 4, 2016

(51) Int. Cl.
*H04W 36/00* (2009.01)
*H04B 13/00* (2006.01)

(52) U.S. Cl.
CPC ....... *H04W 36/0022* (2013.01); *H04B 13/005* (2013.01)

(58) Field of Classification Search
CPC .................................................. H04W 36/0022
See application file for complete search history.

(56) References Cited

U.S. PATENT DOCUMENTS

| | | |
|---|---|---|
| 6,580,356 B1 | 6/2003 | Alt et al. |
| 7,202,773 B1 | 4/2007 | Oba et al. |
| 2005/0008148 A1 | 1/2005 | Jacobson |
| 2005/0243061 A1 | 11/2005 | Liberty et al. |
| 2007/0145119 A1 | 6/2007 | Rhelimi |
| 2007/0282783 A1 | 12/2007 | Singh |
| 2009/0094681 A1 | 4/2009 | Sadler et al. |
| 2010/0277435 A1 | 11/2010 | Han et al. |

(Continued)

FOREIGN PATENT DOCUMENTS

| | | |
|---|---|---|
| EP | 2018038 | 1/2009 |
| EP | 2378748 | 10/2011 |

(Continued)

OTHER PUBLICATIONS

Bionym, "The Nymi White Paper", Nov. 19, 2013.
International Search Report for corresponding International Application No. PCT/IB2015/055153 mailed Oct. 29, 2015.

*Primary Examiner* — Martin Mushambo
(74) *Attorney, Agent, or Firm* — Renner, Otto, Boisselle & Sklar, LLP.

(57) ABSTRACT

The present disclosure relates generally to a method and a wireless communication device that optimizes communication between devices which is body contact initiated. The method, performed in the wireless communication device comprises pairing with another wireless communication device using a first communication technology, wherein the first communication technology is Body Coupled Communication, BCC, technology, exchanging, between the wireless communication device and the other wireless communication device, using BCC technology, device specific information associated with pairing in a second communication technology and connecting with the other wireless communication device, using the second communication technology, thereby performing a handover from BCC technology to the second communication technology.

10 Claims, 6 Drawing Sheets

(56) References Cited

U.S. PATENT DOCUMENTS

| | | | |
|---|---|---|---|
| 2010/0311326 A1* | 12/2010 | Klabunde | H04B 5/0012 |
| | | | 455/41.1 |
| 2011/0205156 A1 | 8/2011 | Gomez et al. | |
| 2012/0026129 A1 | 2/2012 | Kawakami | |
| 2012/0249409 A1 | 10/2012 | Toney et al. | |
| 2012/0324368 A1 | 12/2012 | Putz et al. | |
| 2013/0017789 A1 | 1/2013 | Chi et al. | |
| 2013/0174049 A1 | 7/2013 | Townsend et al. | |
| 2014/0085050 A1 | 3/2014 | Luna | |

FOREIGN PATENT DOCUMENTS

| | | |
|---|---|---|
| EP | 2600319 | 6/2013 |
| EP | 2 811 809 A1 | 12/2014 |
| JP | 2008 073462 | 4/2008 |
| JP | 2009 049951 | 3/2009 |
| WO | 2006/120582 A1 | 11/2006 |
| WO | 2008/015591 A1 | 2/2008 |
| WO | 2011/021531 | 2/2011 |

\* cited by examiner

BODY CONTACT COMMUNICATION OPTIMIZATION WITH LINK KEY EXCHANGE

TECHNICAL FIELD

The present disclosure relates generally to a method and a wireless communication device that optimizes communication between devices which are body contact initiated.

BACKGROUND

There is an emerging consumer market for certain devices that are used as companion products to smartphone devices. Their popularity can be traced, in part, to the variety of features they provide to a user. For example, one such device is a wearable device, such as a ring worn on the user's finger, a necklace, glasses, or a "wristlet" (e.g., a watch or wristband) that is worn around a user's wrist. Typically, such wearable devices may provide different features, such as a logging function that monitors the user's motion and resting activities, and then sends a report on the detected motion and activities to the user's smartphone for storage in memory. Another feature allows the wearable devices to be used as a personal token to automatically gain access to a smartphone that has been locked. Particularly, a wearable device worn by the user may communicate with the user's smartphone. Then the wearable device and the smartphone continuously exchange data between them.

Furthermore, it is common that two users with wireless communication devices wish to exchange data between the devices. The data is for example images, videos or internet addresses.

There is always the need to improve and simplify the transferring of files between devices. A user wants a data transfer to be as simple as possible to set up but it is important that it is still secure and fast.

SUMMARY

With the above description in mind, then, an aspect of the present disclosure is to provide a method and a device which initiates communication to another device by body contact, which seek to mitigate, alleviate, or eliminate one or more of the above-identified deficiencies in the art and disadvantages singly or in any combination.

These and other objects are achieved by a method and a communication device which initiates communication via a Body Area Network, BAN, using Body Coupled Communication, BCC, technology.

The present disclosure is defined by the appended claims. Various advantageous embodiments of the disclosure are set forth by the appended claims as well as by the following description and the accompanying drawings.

According to some aspects the disclosure provides for a method, performed in a wireless communication device, for body contact initiated communication.

According to some aspects, the method comprises pairing with another wireless communication device using a first communication technology, wherein the first communication technology is Body Coupled Communication, BCC, technology, exchanging, between the wireless communication device and the other wireless communication device, using BCC technology, device specific information associated with pairing in a second communication and connecting with the other wireless communication device, using the second communication technology, thereby performing a handover from BCC technology to the second communication technology. By performing these steps, a way to provide handover from a BCC connection to another type of connection between two devices is provided. By first pairing using BCC, it is ensured that the two wireless communication devices are present on, or are in very close proximity, of the body of a user, or on the body of two users who are touching. There are many situations where connecting with BCC is beneficial. For example if a user wants to connect his/her wireless communication device with a wearable wireless communication device such as a wristlet. Another example is when a user wants to connect his/her wireless communication device in a wireless communication enabled home appliance device. Another example is when two people met and want to exchange data. The BCC connection is then a way to ensure that the users are touching to provide a measure of security. Transferring data between two devices can be slow with BCC technology, therefore the connection is transferred from BCC to another communication technology. Thus, the connection is first set up using BCC technology which ensures that the devices are both present on, or in close proximity to, the same body or two touching bodies, and then the connection is handed over to another communication means which preferably provides a faster connection than the BCC connection.

According to some aspects, the method comprises that the handover is initiated by an impending transfer of data between the wireless communication device and the other wireless communication device, and wherein the amount of data is larger than a predetermined threshold amount. By only performing the handover from BCC to the other communication technology if there is an impending data transfer of a certain size, a way to perform the handover when necessary is provided. That is, if the amount of data is large, the BCC connection will take a long time to transfer the data because of its limited bit rate and then the connection will be handed over to another communication technology for a faster transfer.

According to some aspects, the exchanging comprises sending, using BCC technology, information specific for the wireless communication device associated with pairing in a second communication technology and receiving, using BCC technology, information specific for the other wireless communication device associated with pairing in a second communication technology. In other words, exchanging comprises both sending and receiving device specific information so that the wireless communication device and the other wireless communication device have exchanged information to enable handover to the second communication technology.

According to some aspects, the method comprises exchanging lists of available communication technology between the wireless communication device and the other wireless communication device. If there are several available communication technologies the wireless communication device must be able to determine which technologies are available to both devices and to choose a suitable technology.

According to some aspects, the method comprises selecting the second communication technology to be a communication technology which is available on both devices according to a predetermined priority list. Thus, a way to select the second communication technology is provided. The priority list may for example be based on transfer rates or on prises for transfer. In other words, a way to minimize cost and/or maximise transfer rates is provided.

According to some aspects, the method comprises continuously pinging for the other wireless communication device using BCC technology and disconnecting the connection to the other wireless communication device with the second communication technology when a BCC contact to the other communication device is lost. An advantage of this is that the second communication technology connection also depends on the BCC connection. So if a user of the wireless communication device wants a temporary connection to another wireless communication device for exchanging files this method may be used that is dependent on body contact for maintaining the connection even if the connection is not using BCC technology.

According to some aspects, the second communication technology is any type of radio frequency communication technology or infrared communication technology. In other words, the second communication technology may be any other type of communication technology suitable for a wireless communication device.

According to some aspects, the device specific information associated with pairing in a second communication technology comprises a link key. Thus, a way to securely set up a channel in the second communication technology is provided by exchanging the link key to the channel using BCC.

According to some aspects the disclosure provides for a wireless communication device, comprising Body Coupled Communication, BCC, technology and technology for at least one second communication technology.

According to some aspects, the wireless communication device comprises communication circuitry and processing circuit. The processing circuitry is configured to: pair, using the communication circuitry, with another wireless communication device using a first communication technology, wherein the first communication technology is Body Coupled Communication, BCC, technology, to exchange, between the wireless communication device and the other wireless communication device, using BCC technology, device specific information associated with pairing in a second communication technology and to connect with the other wireless communication device, using the second communication technology, thereby performing a handover from BCC technology to the second communication technology. Thus, a wireless communication device for performing the above discussed method is provided. The advantages have been previously discussed.

According to some aspects, the second communication technology is any type of radio frequency communication technology or infrared communication technology. The advantages have been previously discussed.

According to some aspects the device specific information associated with pairing in a second communication technology comprises a link key. The advantages have been previously discussed.

According to some aspects the disclosure provides for a computer readable program, which, when executed on a wireless communication device, causes the wireless communication device to perform the method according to above. Thus, a computer program for performing the above discussed method is provided. The advantages have been previously discussed.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Aspects of the present disclosure will be described more fully hereinafter with reference to the accompanying drawings. The device and method disclosed herein can, however, be realized in many different forms and should not be construed as being limited to the aspects set forth herein.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

Embodiments of the present disclosure will be exemplified using a wireless communication device such as a mobile phone. However, it should be appreciated that the disclosure is as such equally applicable to any wireless communication devices which have communication capabilities. Examples of such devices may for instance be any type of mobile phone, smartphone, laptop (such as standard, ultra portables, netbooks, and micro laptops), handheld computers, portable digital assistants, tablet computers, touch pads, gaming devices, accessories to mobile phones, e.g. wearables in the form of headphones/-sets, visors/goggles, bracelets, wristbands, necklaces, watches, headbands, rings, etc. It should be noted that a wireless communication device is any wireless communication device equipped with wireless communication means and can be e.g. a coffee machine, a lamp post or a door.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Body-Coupled Communications, BCC, also referred to as Body-Based Communication, BBC or Near-Body Communication, NBC, has been proposed as a promising alternative to radio frequency, RF, communication as a basis for Body/Personal Area Network, BAN/PAN, communication. BCC allows for an exchange of information between a plurality of devices which are in contact with or in close proximity of a living body. This can be achieved by the transmitting BCC-/BAN-antenna that provides a capacitive or galvanic coupling of low-energy electrical fields onto the body surface, i.e. leakage currents with a small magnitude is set to spread out over the human body. The small currents are then detected by a receiver BCC-/BAN-antenna, located on the same body or on another body in contact with the first. Thus, signals are conveyed over the body instead of through the air. As such, the communication is confined to the volume close to the body in contrast to RF communications, where a much larger volume is covered. Therefore, communication is possible between devices situated on, connected to, or placed close to the body. The power consumption of BCC-/BAN-antennas is very low.

BCC/BBC is no new technique, and it has previously been employed within the fields of e.g. medical sensor devices and exercise sensors. Within these fields, sensors attached to the users skin or worn in the close proximity of the body is employed for monitoring different body functions in order to keep track of medical status or fitness parameters of the user. To send the collected data to a central unit e.g. BCC/BBC can be utilized.

The proposed technique will now be described referring to FIGS. 1-9. As previously discussed, the disclosure provides for a method and device for body contact initiated communication. The method is performed in a wireless communication device 1, comprising Body Coupled Communication, BCC, technology and technology for at least one second communication technology, which communicates with another wireless communication device 2.

Figure 1:
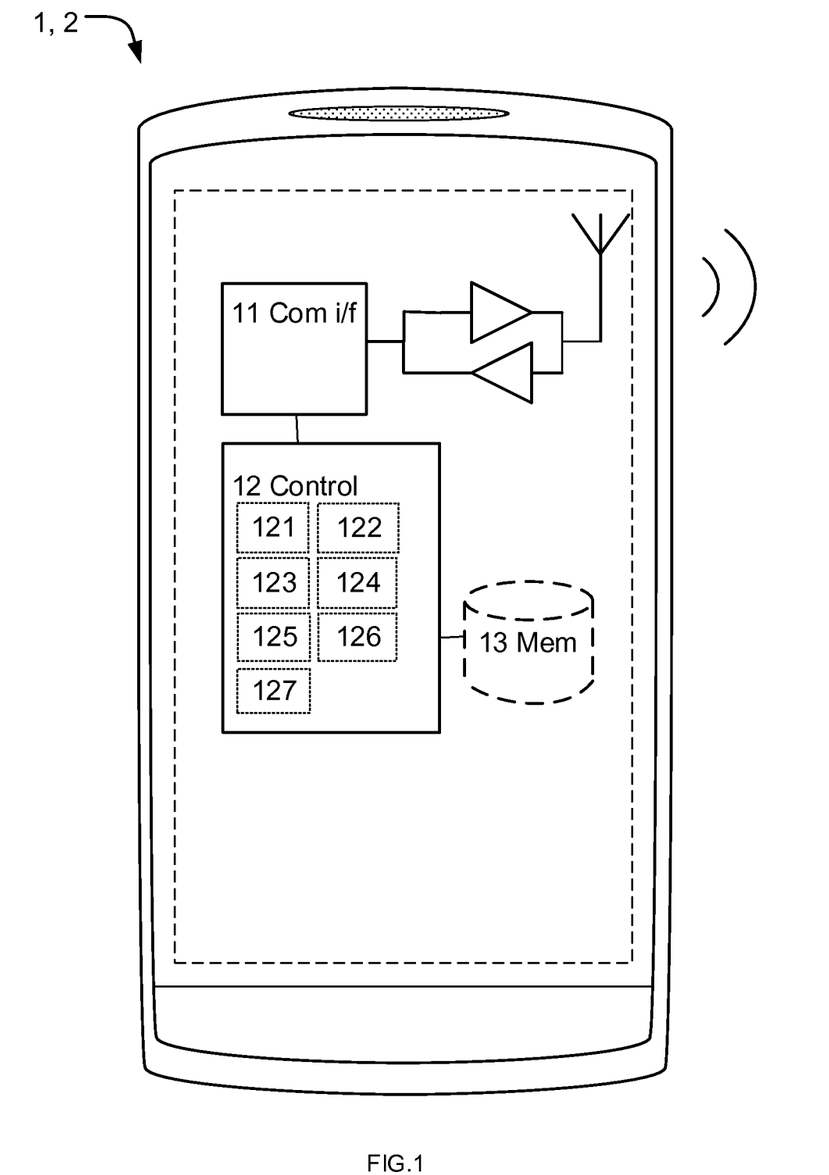
FIGS. 1-6 illustrates examples of wireless communication devices.

FIG. 1 shows a wireless communication device according to some aspects of the disclosure. The figure illustrates a Body Coupled Communication, BCC, enabled wireless communication device 1, comprising communication circuitry 11 and processing circuitry 12. The wireless communication device further comprises a memory 13 for storing data. The memory may be any type of memory suitable for a wireless communication device.

Figure 2:
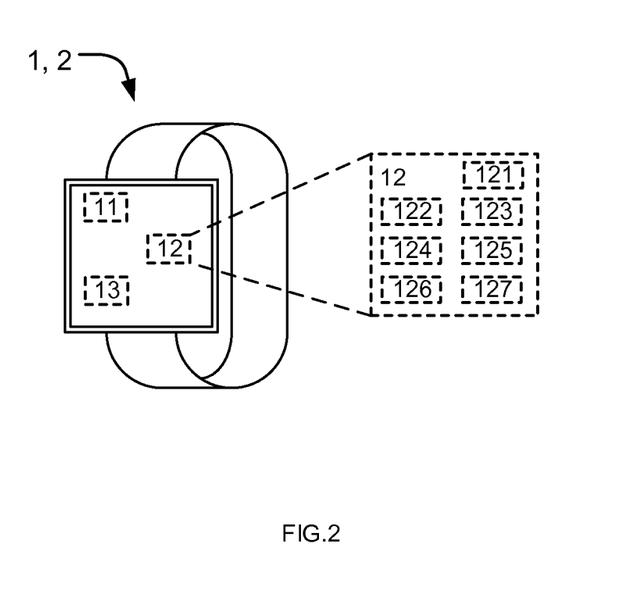
Figure 3:
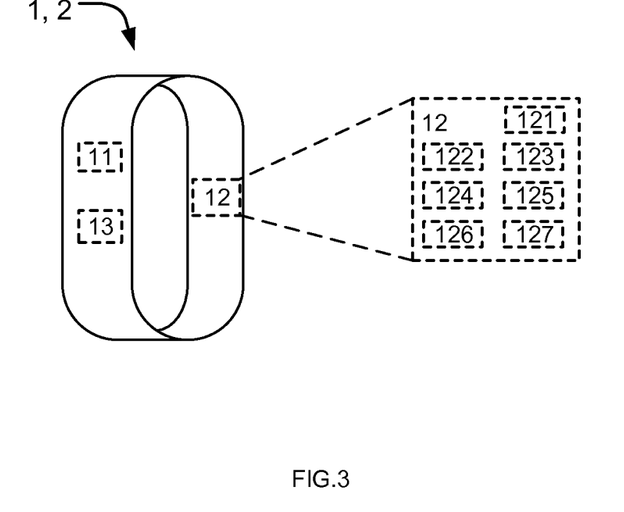
Figure 4:
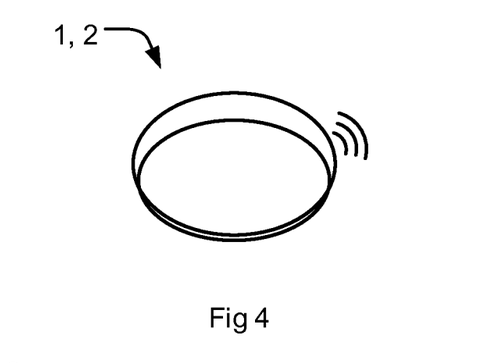
Figure 5:
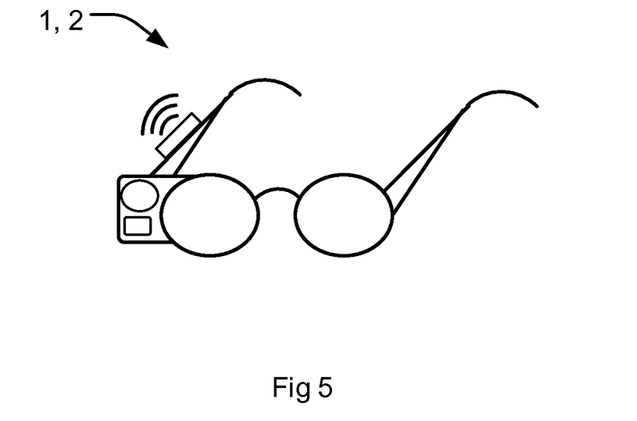
Figure 6:
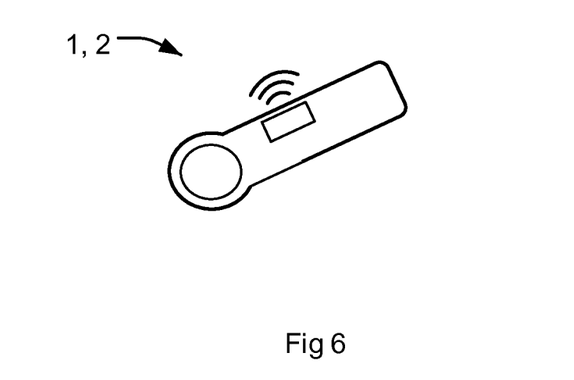

FIGS. 2 to 6 shows other examples of BCC enabled wireless communication devices; in these cases wearable wireless communication devices. FIG. 2 is a watch, FIG. 3 is a wristlet, FIG. 4 is a ring, FIG. 5 is glasses and FIG. 6 is a headpiece.

Note that the devices of FIGS. 1 to 6 are all examples of wireless communication devices 1 which also illustrates examples of the "another" or "other" wireless communication 2.

Figure 7:
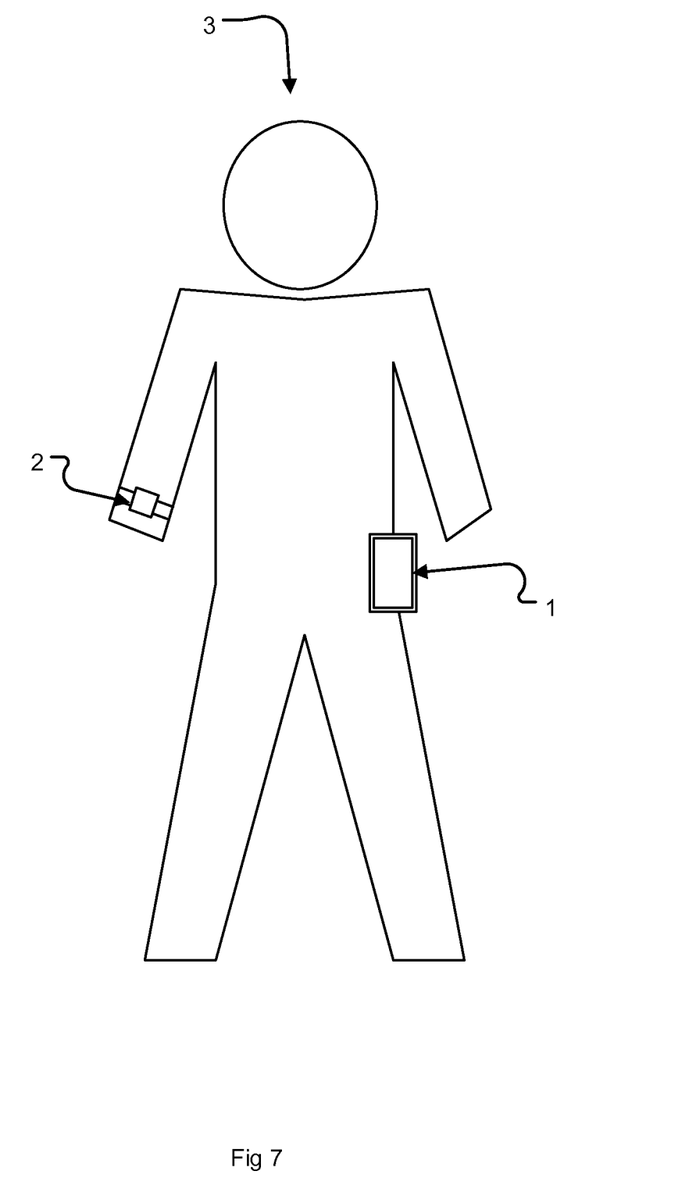
FIG. 7 illustrate a user with a wireless communication device and another wireless communication device.

FIG. 7 illustrates a user 3 with a wireless communication device in his/her pocket or attached to his/her belt and another wireless communication device in the form of a watch on the wrist of the user.

Figure 8:
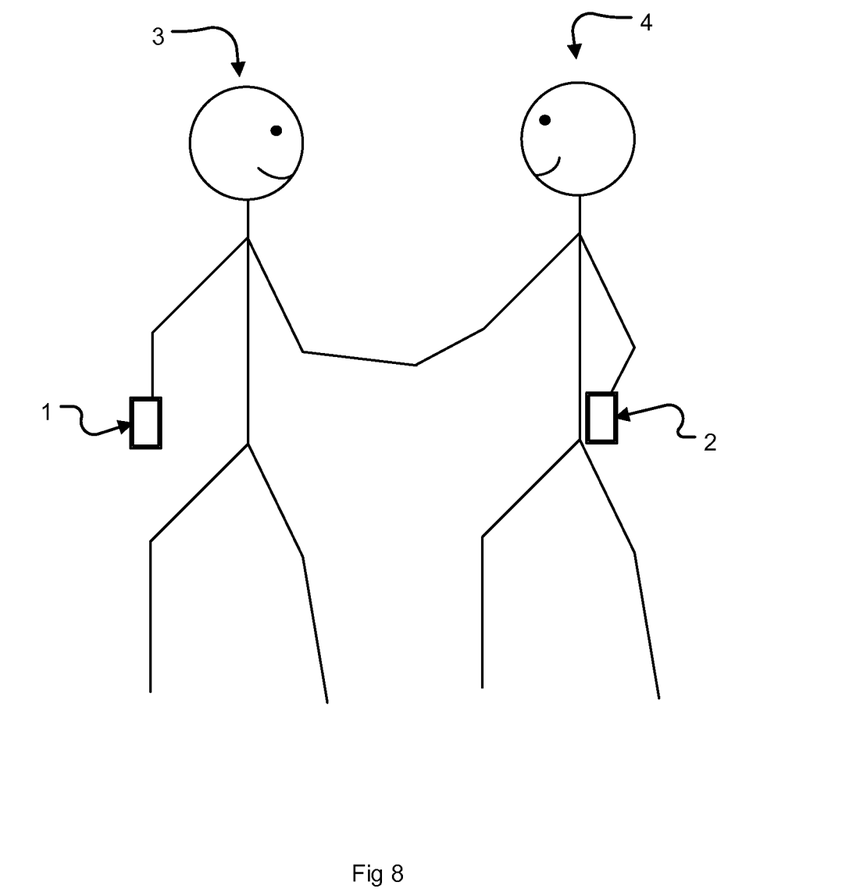
FIG. 8 illustrate a user with a wireless communication device shaking hands with a user of another wireless communication device.

In FIG. 8, two users shake hands. One user 3 has the wireless communication device 1 in his/her hand and the other user 4 has the other wireless communication device in his/her hand.

Figure 9:
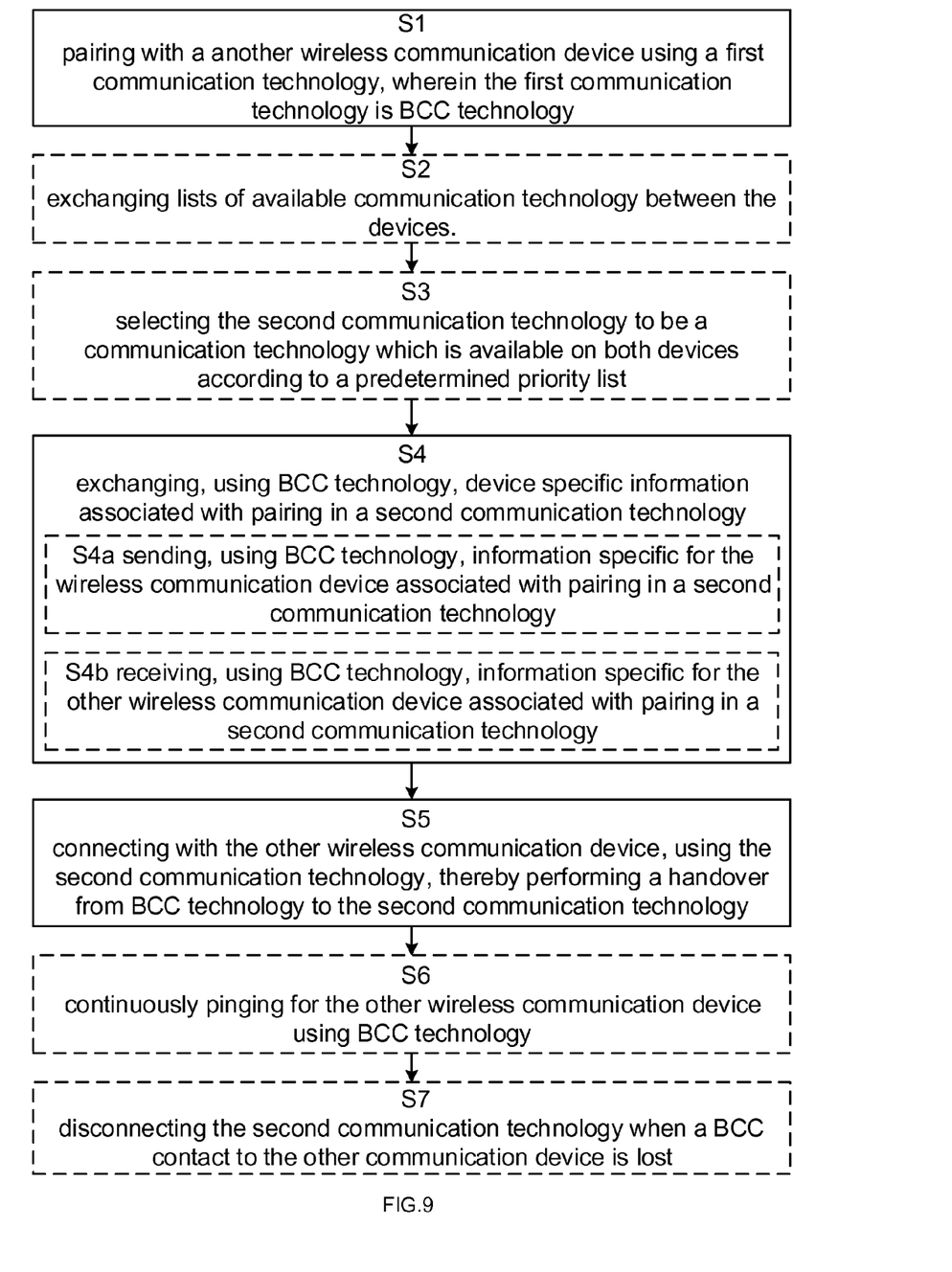
FIG. 9 is a flow chart illustrating the proposed method, performed in the wireless communication device.

FIG. 9 is a flow diagram depicting example operations which may be taken by the wireless communication device 1 of FIGS. 1-8, for body contact initiated communication. The wireless communication device and the other wireless communication device 2 are both Body Coupled Communication, BCC, enabled. The operations of the flow diagram will be described together with the devices of FIGS. 1 to 8.

The method comprises pairing S1 with another wireless communication device 2 using a first communication technology, wherein the first communication technology is Body Coupled Communication, BCC, technology. The processing circuitry 12 is configured to pair S1 with the other device using the communication circuitry 11. According to some aspects, the processing circuitry comprises a pairer 121 for pairing. By first pairing using BCC, it is ensured that the two wireless communication devices are present on, or are in very close proximity, of the body of a user, or on the body of two users who are touching. There are many situations where connecting with BCC is beneficial. For example if a user wants to connect his/her wireless communication device with a wearable wireless communication device such as a wristlet as illustrated in FIG. 7. Another example is when a user wants to connect his/her wireless communication device in a wireless communication enabled home appliance device. Another example is when two people met and want to exchange data as illustrated in FIG. 8. The BCC connection is then a way to ensure that the users are touching to provide a measure of security. Pairing of two devices using BCC comprises that the devices find each other using a BCC signal and that they exchange information to set up a BCC channel between each other. The exchanged information is for example a shared secret key to the channel. One example of pairing is to use a Deffie-Hellman key exchange which is a method of securely exchanging cryptographic keys over a public channel.

According to some aspects, the method comprises exchanging S2 lists of available communication technology between the wireless communication device 1 and the other wireless communication device 2. The processing circuitry 12 is configured to exchange S2 the list. According to some aspects, the processing circuitry comprises a first exchanger 122 for the exchanging. If there are several available communication technologies the wireless communication device must be able to determine which technologies are available to both devices and to choose a suitable technology. When both wireless communication devices have information about which communication technologies are available to both devices a selection of a communication technology is made. According to some aspects, the selecting comprises selecting S3 the second communication technology to be a communication technology which is available on both devices according to a predetermined priority list. The processing circuitry 12 is configured to select S3 the second communication technology. According to some aspects, the processing circuitry comprises a selector 123 for selecting. Thus, a way to select a second communication technology is provided. The priority list may for example be based on transfer rates or on prises for transfer. In other words, a way to minimize cost and/or maximise transfer rates is provided. If minimizing the cost for data transfer is prioritized then the first choice for the second communication technology may be for example WiFi, WiFi Direct, Bluetooth or Bluetooth Low Energy. The selection may also be based on expected channel quality of the second communication technology. The selection may also be performed by letting the user choose a second communication technology on a list presented on a screen of the wireless device.

The method comprises exchanging S4, between the wireless communication device and the other wireless communication device, using BCC technology, device specific information associated with pairing in the second communication technology. The processing circuitry 12 is configured to exchange S4, via the communication circuitry 11, the device specific information. According to some aspects, the processing circuitry comprises a second exchanger 124 for exchanging. Note that the second communication technology is different from BCC technology. In other words, the second communication technology is another communication technology than BCC technology. The device specific information associated with pairing in the second communication technology is for example the identification, ID, of the devices as used in that second communication technology or an ID in a WiFi network together with the password for the WiFi. According to some aspects, pairing of the wireless communication device and the other wireless communication device in the second communication technology is performed using BCC such that when the devices start communicating using the second communication technology, they are already paired. In other words, pairing is already initiated and/or completed when handing over to the second communication technology. The term handover or "handing over" refers to the process of transferring an ongoing data session from one channel between devices to another channel. The exchanging S4 comprises for example sending S4a, using BCC technology, information specific for the wireless communication device associated with pairing in a second communication technology and receiving S4b, using BCC technology, information specific for the other wireless communication device associated with pairing in a second communication technology. In other words, exchanging comprises both sending and receiving of device specific information so that the wireless communication device and the other wireless communication device have exchanged information to enable handover to the second communication technology.

The method comprises connecting S5 with the other wireless communication device, using the second communication technology, thereby performing a handover from BCC technology to the second communication technology. The processing circuitry 12 is configured to connect, via the communication circuitry 11, to the other wireless communication device. According to some aspects, the processing circuitry comprises a connector 125 for connecting. By performing these steps, a way to provide handover from a BCC connection to another type of connection between two devices is provided. Transferring data between two devices can be slow with BCC technology, therefore the connection is transferred from BCC to another communication technology. Thus, the connection is first set up using BCC technology which ensures that the devices are both present on, or in close proximity to, the same body or two touching bodies, and then the connection is handed over to another communication means which preferably provides a faster connection than the BCC connection. The term first communication technology is interchangeable with the term the first communication means. The term second communication technology is interchangeable with the term the second communication means There are several ways to initiate the handover. According to some aspects, the method comprises that the handover is initiated by an impending transfer of data between the wireless communication device 1 and the other wireless communication device 2, and wherein the amount of data is larger than a predetermined threshold amount. By only performing the handover from BCC to the other communication technology if there is an impending data transfer of a certain size, a way to perform the handover when necessary is provided. That is, if the amount of data is large, the BCC connection will take a long time to transfer the data because of its limited bit rate and then the connection will be handed over to another communication technology for a faster transfer. In other words, according to some aspects the handover from BCC technology to the second communication technology only takes place if there is data to be transferred between the devices which amount exceeds a predetermined amount of data. The predetermined threshold amount is for example 0.2 Mb, 0.5 Mb, 1 Mb, 500 Mb or 1 Gb. The appropriate amount will vary depending on the type of wireless communication device used with the disclosure. The threshold amount may also depend on the actual bit rate of the BCC channel between the devices. In that case, if the channel provides a high bit rate the threshold is higher.

If it is desired that the communication channel via the second communication technology only is maintained as long as there is a body present between the devices, the method comprises continuously pinging S6 for the other wireless communication device 2 using BCC technology and disconnecting S7 the connection to the other wireless communication device with the second communication technology when a BCC contact to the other communication device is lost. The processing circuitry 12 is configured to ping S6, via the communication circuitry, for the other wireless communication device. According to some aspects, the processing circuitry comprises a pinger 126 for pinging. The processing circuitry 12 is configured to disconnect, via the communication circuitry, the other wireless communication device. According to some aspects, the processing circuitry comprises a disconnector 127 for disconnecting. An advantage of this is that the second communication technology connection also depends on the BCC connection. So if a user of the wireless communication device wants a temporary connection to another wireless communication device for exchanging files this method may be used that is dependent on body contact for maintaining the connection even if the connection is not using BCC technology. The user of the wireless communication device can be sure that the connection to the other communication device is disconnected if body contact is lost between the devices.

The second communication technology may be any type of radio frequency communication technology. According to some aspects, the second communication technology is any type of radio frequency communication technology or infrared communication technology. According to some aspects the second communication technology is any type of communication technology used in mobile phones, such as Near Field Communication, Bluetooth, Bluetooth Low Energy, WiFi or WiFi Direct. In other words, the second communication technology may be any other type of communication technology suitable for a wireless communication device.

During a pairing process, two devices involved establish a relationship by creating a shared secret known as a link key. If a link key is stored by both devices they are said to be paired or bonded. Once a link key has been generated, the link between the devices may be encrypted so that the data that they exchange over the airwaves is protected against eavesdropping. According to some aspects, the device specific information associated with pairing in a second communication technology comprises a link key. The link key will be used to encrypt data over the second communication channel. Thus, a way to securely set up a channel in the second communication technology is provided by exchanging the link key to the channel using BCC.

It should be appreciated that the flow diagrams of FIG. 9 comprises some operations which are illustrated with a solid border and some operations which are illustrated with a dashed border. The operations which are comprised in a solid border are operations which are comprised in the broadest aspects of the disclosure. The operations which are comprised in a dashed line are aspects of the disclosure which may be comprised in, or a part of, or are further operations which may be taken in addition to the operations of the broader aspects of the disclosure. It should be appreciated that the operations need not be performed in the order in which they are presented in FIG. 9 or in the disclosed embodiments. For example, the operation of continuously pinging S6 for the other wireless communication device can be continuously performed after operation S2. Furthermore, it should be appreciated that not all of the operations need to be performed. Also, the functions or steps noted in the blocks can according to some aspects of the disclosure be executed continuously in a loop.

The description of the aspects of the disclosure provided herein has been presented for purposes of illustration. The description is not intended to be exhaustive or to limit aspects of the disclosure to the precise form disclosed, and modifications and variations are possible in light of the above teachings or may be acquired from practice of various alternatives to the provided aspects of the disclosure. The examples discussed herein were chosen and described in order to explain the principles and the nature of various aspects of the disclosure and its practical application to enable one skilled in the art to utilize the aspects of the disclosure in various manners and with various modifications as are suited to the particular use contemplated. The features of the aspects of the disclosure described herein may be combined in all possible combinations of methods, apparatus, modules, systems, and computer program products. It should be appreciated that the aspects of the disclosure presented herein may be practiced in any combination with each other.

It should be noted that the word "comprising" does not necessarily exclude the presence of other elements or steps than those listed. It should further be noted that any reference signs do not limit the scope of the claims, that the aspects of the disclosure may be implemented at least in part by means of both hardware and software, and that several "means" or "devices" may be represented by the same item of hardware.

The various aspects of the disclosure described herein are described in the general context of method steps or processes, which may be implemented according to some aspects by a computer readable program, which, when executed on a wireless communication device 1, causes the wireless communication device to perform the method according to above. The computer program, embodied in a computer-readable medium, includes computer-executable instructions, such as program code, executed by computers in networked environments. A computer-readable medium may include removable and non-removable storage devices 13 including, but not limited to, Read Only Memory, ROM, Random Access Memory, RAM, compact discs, CDs, digital versatile discs, DVD, etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Embodiments and aspects are disclosed in the following items:

Item 1. A method, performed in a wireless communication device (1), for body contact initiated communication, comprising:
  pairing (S1) with another wireless communication device (2) using a first communication technology, wherein the first communication technology is Body Coupled Communication, BCC, technology;
  exchanging (S4), between the wireless communication device and the other wireless communication device, using BCC technology, device specific information associated with pairing in a second communication technology;
  connecting (S5) with the other wireless communication device, using the second communication technology, thereby performing a handover from BCC technology to the second communication technology.

Item 2. The method according to Item 1, wherein the handover is initiated by an impending transfer of data between the wireless communication device (1) and the other wireless communication device (2), and wherein the amount of data is larger than a predetermined threshold amount.

Item 3. The method according to any preceding Item, wherein the exchanging (S4) comprises:
  sending (S4a), using BCC technology, information specific for the wireless communication device associated with pairing in a second communication technology;
  receiving (S4b), using BCC technology, information specific for the other wireless communication device associated with pairing in a second communication technology.

Item 4. The method according to any preceding Item, comprising:
  exchanging (S2) lists of available communication technology between the wireless communication device (1) and the other wireless communication device (2).

Item 5. The method according to Item 4, comprising:
  selecting (S3) the second communication technology to be a communication technology which is available on both devices according to a predetermined priority list.

Item 6. The method according to any preceding Item, comprising:
  continuously pinging (S6) for the other wireless communication device (2) using BCC technology;
  disconnecting (S7) the connection to the other wireless communication device with the second communication technology when a BCC contact to the other communication device is lost.

Item 7. The method according to any preceding Item, wherein the second communication technology is any type of radio frequency communication technology or infrared communication technology.

Item 8. The method according to any preceding Item, wherein the device specific information associated with pairing in a second communication technology comprises a link key.

Item 9. A wireless communication device (1), comprising Body Coupled Communication, BCC, technology and technology for at least one second communication technology, comprising:
  communication circuitry (11);
  processing circuit (12) configured to:
    pair (S1), using the communication circuitry, with another wireless communication device (2) using a first communication technology, wherein the first communication technology is Body Coupled Communication, BCC, technology;
    exchange (S4), between the wireless communication device and the other wireless communication device, using BCC technology, device specific information associated with pairing in a second communication technology;
    connect (S5) with the other wireless communication device, using the second communication technology, thereby performing a handover from BCC technology to the second communication technology.

Item 10. The wireless communication device (1) according to Item 9, wherein the second communication technology is any type of radio frequency communication technology or infrared communication technology.

Item 11. The wireless communication device (1) according to Item 9 or 10, wherein the device specific information associated with pairing in a second communication technology comprises a link key.

Item 12. A computer readable program, which, when executed on a wireless communication device (1), causes the wireless communication device to perform the method according to any of Items 1 to 8.

In the drawings and specification, there have been disclosed aspects of the disclosure. However, many variations and modifications can be made to these aspects of the disclosure. Accordingly, although specific terms are employed, they are used in a generic and descriptive sense only and not for purposes of limitation, the scope of the aspects of the disclosure being defined by the following claims.

The invention claimed is:

1. A method, performed in a wireless communication device, for body contact initiated communication, comprising:
   pairing with another wireless communication device using a first communication technology, wherein the first communication technology is Body Coupled Communication, BCC, technology;
   exchanging, between the wireless communication device and the other wireless communication device, using BCC technology, device specific information associated with pairing in a second communication technology, wherein the device specific information associated with pairing in the second communication technology comprises a link key;
   connecting with the other wireless communication device, using the second communication technology, thereby performing a handover from BCC technology to the second communication technology;
   continuously pinging for the other wireless communication device using BCC technology; and
   disconnecting the connection to the other wireless communication device with the second communication technology when a BCC contact to the other communication device is lost.

2. The method according to claim 1, wherein the exchanging comprises:
   sending, using BCC technology, information specific for the wireless communication device associated with pairing in a second communication technology;
   receiving, using BCC technology, information specific for the other wireless communication device associated with pairing in a second communication technology.

3. The method according to claim 1, comprising:
   exchanging lists of available communication technology between the wireless communication device and the other wireless communication device.

4. The method according to claim 3, comprising:
   selecting the second communication technology to be a communication technology which is available on both devices according to a predetermined priority list.

5. The method according to claim 1, wherein the second communication technology is any type of radio frequency communication technology or infrared communication technology.

6. A non-transitory computer readable medium comprising executable instructions, which, when executed on a wireless communication device, causes the wireless communication device to perform the method according to claim 1.

7. A method, performed in a wireless communication device, for body contact initiated communication, comprising:
   pairing with another wireless communication device using a first communication technology, wherein the first communication technology is Body Coupled Communication, BCC, technology;
   exchanging, between the wireless communication device and the other wireless communication device, using BCC technology, device specific information associated with pairing in a second communication technology;
   connecting with the other wireless communication device, using the second communication technology, thereby performing a handover from BCC technology to the second communication technology, wherein the handover is initiated by an impending transfer of data between the wireless communication device and the other wireless communication device, and wherein the amount of data is larger than a predetermined threshold amount.

8. A wireless communication device, comprising Body Coupled Communication, BCC, technology and technology for at least one second communication technology, comprising:
   communication circuitry;
   processing circuit configured to:
      pair, using the communication circuitry, with another wireless communication device using a first communication technology, wherein the first communication technology is Body Coupled Communication, BCC, technology;
      exchange, between the wireless communication device and the other wireless communication device, using BCC technology, device specific information associated with pairing in a second communication technology wherein the device specific information associated with pairing in the second communication technology comprises a link key;
      connect with the other wireless communication device, using the second communication technology, thereby performing a handover from BCC technology to the second communication technology;
      continuously ping for the other wireless communication device using BCC technology;
      disconnect the connection to the other wireless communication device with the second communication technology when a BCC contact to the other communication device is lost.

9. The wireless communication device according to claim 8, wherein the second communication technology is any type of radio frequency communication technology or infrared communication technology.

10. The wireless communication device according to claim 8, wherein the device specific information associated with pairing in a second communication technology comprises a link key.

* * * * *